Nov. 19, 1968  C. L. BROWN ET AL  3,411,414
SERVOMOTOR REQUIRING MINIMUM MOVEMENT OF ACTUATOR
Filed June 27, 1966
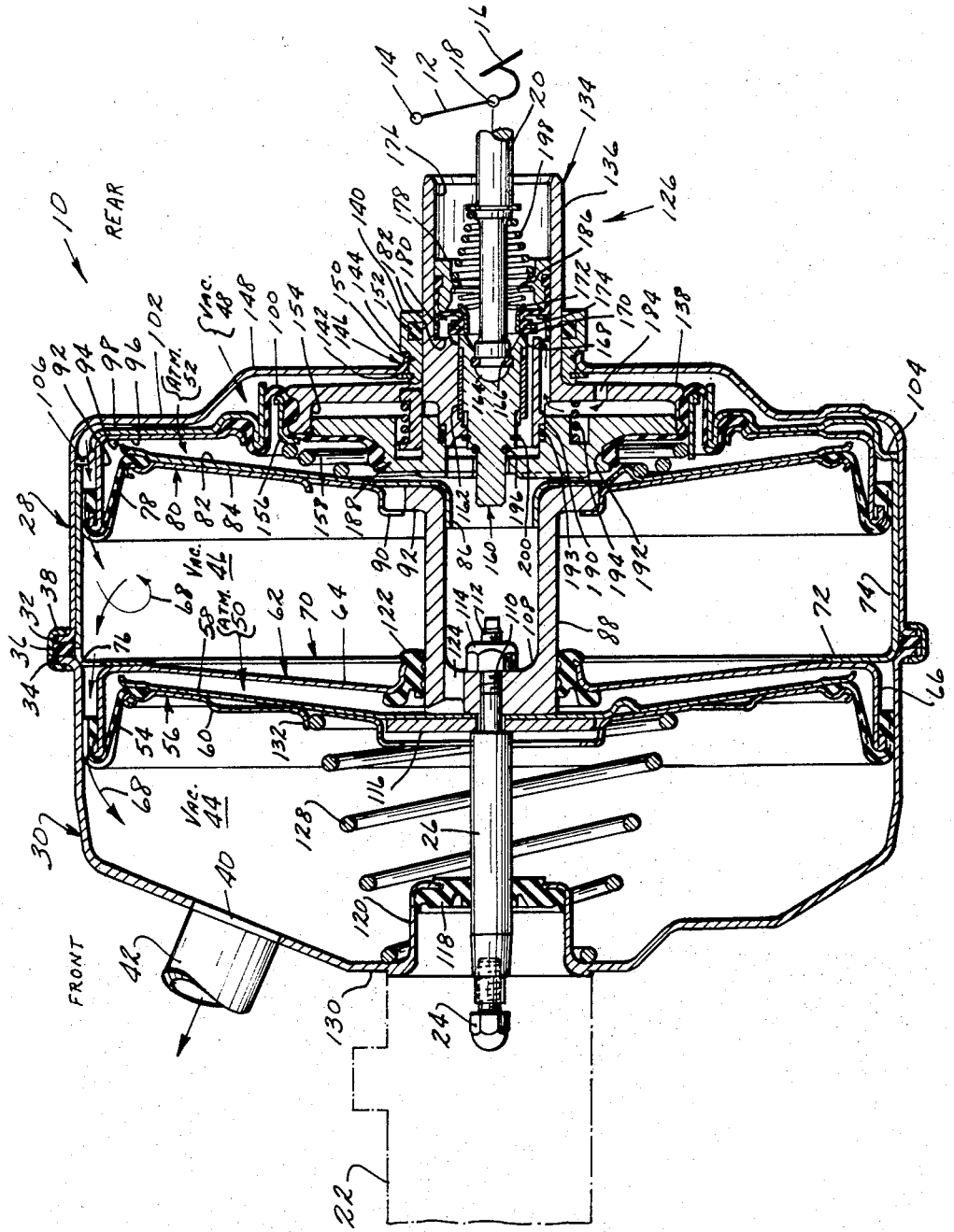
INVENTORS
CURTIS L. BROWN
HENRY FUNCKES
BY
IRVIN L. GROH
ATTORNEY

United States Patent Office

3,411,414
Patented Nov. 19, 1968

3,411,414
SERVOMOTOR REQUIRING MINIMUM
MOVEMENT OF ACTUATOR
Curtis L. Brown and Henry Funckes, Owosso, Mich., assignors to Midland-Ross Corporation, Cleveland, Ohio, a corporation of Ohio
Filed June 27, 1966, Ser. No. 560,729
5 Claims. (Cl. 91—391)

ABSTRACT OF THE DISCLOSURE

A fluid pressure servomotor requiring a minimum amount of movement of a valve actuator and in which a valve body supports both the control valve and its actuator and also forms a cylinder and piston so that the latter acts on the valve actuator upon pressure variations in the servomotor to produce a reaction, and in which an annular diaphragm applies force not only to the piston but also acts on the valve body to maintain it in its initial position in the presence of pressure differentials in the unit.

---

This invention relates to a novel servomotor; and more particularly to a servomotor for no-travel power brake applications.

The problem: evolution of brakes

In early automobiles, brakes were mechanically actuated and required application of brute leg and foot force against the brake pedal, even though the brake pedal worked through a force-multiplying lever arm connection to the control cables. The further the brake pedal was pushed, the more tightly the brake bands were compressed against the drums, and thus the greater the braking force. Thus, the greater the foot force, the greater the braking force, and the greater the pedal resistance against the foot.

When hydraulic brakes came into widespread use in the 1930's, the movable foot pedal was retained, but the foot force was multiplied through a lever arm into a master cylinder, thereby reducing the amount of foot force required. A further advantage was that brake application was applied uniformly at each wheel, for safer stops, as contrasted to mechanical brakes.

The point is that both of the systems utilize a movable brake pedal; and the further the pedal is pushed, the harder it becomes to push. Thus the greater the braking force the greater the pedal resistance against the foot. Accordingly, the motoring public at large became educated to a movable brake pedal wherein the resistance or "feel" against the foot increased as the braking force increased.

Thus, the operators of automotive vehicles became accustomed from a very early date to the sensation of reaction or "feel" on the foot pedal through which they sensed the degree of braking. Consequently, in the development of power brakes it was usual to provide some means to reflect the amount of powered effort being supplied to the brakes. This has been commonly done by one of three methods. One example is by mechanical linkage as in the case of currently manufactured power brakes; see Patent 3,002,499. A second method has been by the use of hydraulic fluid as in Patent 2,878,647. A third method of reaction has been by utilizing the same differential pressure which acts on the power piston as in Patent 3,151,530.

The next step of evolution was the power brake. As automobiles grew in size and weight, greater braking effort was required. This coupled with automation, lead to power assisted brakes. In view of the prior public education, however, the movable pedal was retained. Also aids were built in to simulate increased braking, by increased pedal resistance or reaction against the foot as the braking force built up. These mechanisms utilize fluid-moved diaphragms, powered either by pressurized hydraulic fluid or by gas pressure, using power from the manifold to pull a partial vacuum on one side of the diaphragm. Building in a movable valve for the brake pedal to follow, and setting up increasing foot resistance has made these units relatively complicated and costly to manufacture.

During the development of power brake units, the maximum amount of manual force required to apply the brakes has decreased. At the same time, the amount of pedal travel has become less and less because of the desire to keep the pedal low to approximate the height of the accelerator pedal. It would seem, therefore, that a no-travel brake is a natural development of what has been called the low pedal.

The next step of evolution of brakes therefore, is the no-travel unit wherein the pedal remains essentially stationary. This is the present stage of evolution. However, in view of the public's prior education, evolution must taek place in easy stages. Thus, built-in increasing foot resistance or "feel" must be retained or else the average driver will not be able to control the unit, and will apply excess braking causing dangerous wheel lock and skidding. Prior attempts at this principle have not provided commercially acceptable units, although the literature discloses laboratory models. In this principle of operation, the control valve is normally fixed, instead of being mounted on the movable power wall so that it must be followed with movement of the brake pedal. However, prior fixed pedal units have utilized a plurality of sliding seals between cooperating components to isolate the high and low pressure sides of the system and, as a result, the multiple seal means add substantial friction factors prohibiting proper operation of the device. Accordingly, the economics are greatly against commercial acceptance.

The advance provided by the present invention

In accordance with the present invention, a novel servomotor of the stationary valve-type, or no-travel type is provided that incorporates novel means for accurately sensing the degree of actuation of the servomotor. A greatly improved control element is incorporated in the unit which provides a subtle but substantial difference—amounting to a commercially acceptable unit and one that is economical to manufacture for larger production automobiles, instead of being limited to the higher priced models, as was the usual case in the prior art.

Accordingly, it is an important object to provide a novel servomotor.

A further object is to provide a novel no-travel servomotor specifically adapted for no-travel power brake applications.

These and other objects will appear in the following detailed description and appended claims, reference being had to the accompanying drawing forming a part of this specification, which is a longitudinal sectional view of a servomotor embodying the invention, and schematically illustrating the operable association between the brake pedal and the master cylinder of an automobile.

Introduction to the invention

According to the present invention, a power brake servomotor is provided that is characterized by a high degree of controllability. This is clearly distinguishable from prior power units, which had sufficient power output but were definitely lacking in controllability and were too delicate for the average driver.

Further, the reaction against the foot in the present unit is in direct proportion to the actual braking force.

This provides the driver with greater confidence and a surer "feel." Further, there are no moving seals on the valve control member. The movable valve member is substantially free to float by having a single diameter element loosely supported within a sleeve for easy movement. This provides a very excellent antifriction construction combination responsible in large measure for the performance of the unit, and is very economical to manufacture.

The present invention is a full power unit wherein the power is applied in two stages as follows:

(1) As the foot touches the brake pedal, power is generated in the servomotor causing the system to move the brake shoes out to a "ready" position, just ready to contact the brake drum; and (2) Further, foot pressure causes full application of power which results in the actual braking force or braking work, simultaneously generating a reaction or "feel" against the foot. This provides the simulation of the harder the foot pressure, the more braking.

Upon failure of the pressure source, the brakes can be applied by manual effort alone—in a push through fashion.

In the present invention, all work is done by power. Foot pressure is merely relied on to move a small valve element. This foot pressure is completely independent of the braking force generated by the work cylinder of the servomotor.

*Specific description of the invention: the power cylinder*

The power cylinder is generally designated 10, on the drawing, and is essentially a closed chamber within which three flexible diaphragms operate. At one end there is an operable connection to the brake pedal of the automobile, schematically illustrated as 12. This unit is pivotally mounted at 14 to a suitable member of the automobile frame or body and has a foot-engageable plate 16 for actuation. A pivot 18 is provided for connection to an operating member 20 comprising a part of the valve of the present invention. At the other end of the power cylinder 10, there is an operable connection to a master cylinder of the automobile, schematically illustrated as 22. This unit includes a piston, not shown because conventional, which by means of the cap screw 24 is operably connected to a power rod 26 for actuation.

The servomotor 10 comprises a rear casing shell 28 and a front casing shell 30. These can be defined as generally cylindrical members with closed ends, but each provided at the open abutting ends with radial flanges 32 and 34 between which is a compression fitted gasket 36. The flanges 32 and 34 and the gasket 36 are clamped together by means of a retainer band 38, of U-shaped cross section.

In the front casing shell 30, there is a vent hole 40 for connection to a vacuum line 42, in turn connected to a vacuum source of power such as the manifold of an internal combustion engine.

The large internal chamber formed by the casing shells 28 and 30 is divided into three vacuum chambers 44, 46 and 48 and two power chambers 50 and 52. The vacuum chamber 44 and the associated power chamber 50 are separated from one another by a flexible diaphragm 54 and a movable wall structure 56. The movable wall structure 56 comprises a primary plate 58 and a secondary plate 60. The inner edge of the diaphragm 54 is clamped between the outer edges of the plates 58 and 60 for a gas-proof seal and so that the diaphragm 54 and the movable wall structure 56 can move together. The outer periphery of the diaphragm 54 is held in position by a fixed wall 62, which is of annular construction. The wall 62 includes a radially extending portion 64 and an overturned, axially extending portion 66, see the bottom of the drawing. The outer periphery of the diaphragm 54 is corrugated, or waffle-like wave construction, so that air can be evacuated as indicated by the arrows 68, past the outer periphery. The outer periphery of the diaphragm 54 is pressed outwardly against the inner surface of the rear casing shell 30 by means of the axially extending portion 66 to provide a fluid tight seal between vacuum chamber 44 and power chamber 50.

The fixed wall 62 is attached to wall 70 that has a radial portion 72 and an axial portion 74. The axial portion 74 is of cylindrical shape and is slip-fitted into the inside of the rear casing shell 28. This axial portion 74 positions the fixed wall 62 between front casing shell 30 and radial lip 104. The radial portion 72 is of annular construction; and, as indicated at the top at 76, is provided with spaced holes through which gas can flow along the arrow lines 68 past the outer periphery of the diaphragm 54. The fixed walls 62 and 70 divide the unit 10 and separate the first power chamber 50 from the second vacuum chamber 46.

A second flexible diaphragm 78 and movable wall 80 isolate the second vacuum chamber 46 from the second power chamber 52. The construction of the diaphragm 78 is essentially the same as the first diaphragm 54, with a corrugated outer periphery to permit passage of gas along the arrow lines 68 as previously described. The construction of the movable wall 80 is essentially the same as that of the first movable wall 56. Thus a primary plate 82 and a secondary plate 84 are fastened together so that the outer peripheries will encompass the inner periphery of the diaphragm 78 to form a gas-proof seal.

The inner periphery of the secondary wall 82 is dished at the center to form a hub 86 that embraces the interior end of the annular drive spool 88. The inner periphery of the secondary plate 84 is also deformed as a hub 90 to embrace the outer surface of the radial flange 92 of the drive spool 88. It is to be understood that a gas-proof joint is provided between primary plate 82 and the drive spool 88.

The outer periphery of the secondary diaphragm 78 is held against the inside surface of the axial portion 74 of the fixed wall 70 by means of an axially extending portion 92 of a plate 94. The axial portion 92 is effectively to press the outer periphery of the diaphragm 78 outwardly and hold it in place, providing a fluid-tight seal between vacuum chamber 46 and power chamber 52. The plate 94 also includes a radially extending portion 96. The plate 94 is of annular construction and cooperates with an annular plate 98 to hold the outer periphery of a third flexible diaphragm 100. The two plates 94 and 98 are fastened together to capture the outer periphery of the third diaphragm 100, in the manner indicated, and the plate 98 abuts the radial wall 102 of the rear casing shell 28, with space for gas movement. The plate 98 has a radial lip 104, see the bottom of the drawing, which abuts the back end of the axial portion 74 of the fixed wall 70. The plates 98 and 96 are thereby held in a fixed position against the radial wall 102.

The wall combination 96, 98 separates the second power chamber 52 from the third vacuum chamber 48. However, the third vacuum chamber 48 is connected to the second vacuum chamber 46 by means of a hole 106, see top of drawing, through the radial lip 104 of the plate 98.

Before proceeding further with the discussion, it should be explained that, under static conditions, all chambers are under vacuum and thus the system is balanced. When the unit is actuated, atmospheric pressure is introduced into the two power chambers 50 and 52. This positive pressure acting against the vacuum, provided in the chambers 44 and 46, provides a driving force for operation as will subsequently be made apparent.

The servomotor 10, illustrated, utilizes two power chambers 50 and 52 to provide a greater amount of power in a unit of relatively small diameter. Within the scope of the invention, however, a single atmospheric power chamber, similar to chamber 52, opposed to a single vacuum chamber, similar to chamber 44, can be utilized in a unit of greater diameter for desired output. The advantages of a compact structure, however, will be evident to one skilled in the art.

The two movable walls 56 and 80 are tied together by means of the drive spool 88 so that the combined output force of the walls 56, 80 is transmitted to the master cylinder 22, through the power rod 26. The left-hand end of the drive spool 88 is provided with a crosshead 108. This is bored at 110 to receive the threaded end portion 112 of the power rod 26. A nut 114 tightens the power rod, head 108 and a thrust plate 116 in assembled relationship. The thrust plate 116 holds the primary plate 58 of the movable wall structure 56 against the crosshead 108 and thus locks that wall to one end of the drive spool 88. The connection between the drive spool 88 and the movable wall structure 80 has been previously described.

Proper axial orientation is provided by a first annular elastomeric seal element 118 that slidably embraces the periphery of the power rod 26. The seal element 118 is held in position by an annular portion 120 of the front casing shell 30.

The drive spool 88 is held in proper axial orientation by an annular seal element 122. The annular seal element 122 is snapped into the inner periphery of the fixed wall 62 and slidably embraces the smooth outside cylindrical surface of the drive spool 88. Since the annular seal elements 118 and 122 are fixed, proper axial orientation of the power rod 26 and the drive spool 88 is assured. The seal 118 isolates the atmosphere from the vacuum chamber 44 and the seal 122 isolates the atmospheric chamber 50 from the vacuum chamber 46.

The atmospheric chamber 50 is connected by means of a hole 124 to the interior of the drive spool 88 and thus is placed in communication with the second atmospheric chamber 52. Both atmospheric chambers 50 and 52 are connected through the valve construction of the present invention, designated generally as 126, to the third vacuum chamber 48 and thus all chambers are placed under vacuum in an inoperative or static condition of the servomotor 10.

Since the two movable walls 56 and 80 are effectively connected together to operate in unison by means of the drive spool 88, a single return spring 128 is used to bias these two walls to a return position. The spring 128 is interposed between the radial wall portion 130 of the front casing shell 30 and the secondary plate 60 of the movable wall structure 56. The secondary plate 60 has an index tab 132 which holds the large end of the spring 128 in position.

Description of the valve

The valve body is designated by the reference number 134. This is an annular element that includes a tubular spool portion 136 and a radial wall portion 138. The exterior of the spool portion 136 is a sliding fit within a guide sleeve 140. The sleeve 140 is secured by means of a snap ring 142 and shoulder 144 is an annular flange 146 formed in the radial wall portion 148 of the rear casing shell 28. Annular seal elements 150 and 152 prevent atmosphere from entering the unit at this end.

The outer periphery of the radial wall portion 138 is provided with an axially extending flange 154 which supports a median portion of the third diaphragm 100. A clamp ring 156 secures the median portion of diaphragm 100, as shown, on the flange 154.

The movable valve body 134 is held in a normally fixed position by a compression spring 158 which forces it to the right so that the radial wall portion 138 abuts against the inner end of the sleeve 140.

It will be noted that spring 158 is of lighter pressure than spring 128.

The valve actuator

The valve actuator comprises a solid spool 160 that operates within a sleeve 162 which is pressed into a cylindrical opening in the valve body 134. The combination of the single diameter valve actuator spool 160, operating freely with the sleeve 162, comprises a matched couple which provides a very excellent antifriction combination and is very economical to manufacture.

The rear portion of the valve actuator spool 160 is a spherical socket 164 and the mating spherical end of the operating member 20 is held in place therein by a snap ring 166.

The rear end of the valve actuator spool 160 is made as an annular valve surface 168 which engages an elastomeric valve seat member 170.

The valve seat member 170 is a ring-like element held in proper circular configuration by means of a steel spring retainer 172, on the inside. A radial ring 174 provides radial stiffness for proper lap with the annular valve surface 168. The outer periphery of the valve seal member 170 is held in a bore 176 by a retainer and spring seat member 178. A second retainer ring 180 abuts the bottom of the bore 176 to establish proper axial orientation. A spring 186 is effective to move the valve seat member 170.

The valve seat member 170 serves also to lap or close with or against an annular valve surface 182 formed on a shoulder at the bottom of bore 176. This shuts off vacuum which is normally in chamber 48. A port 184 connects the vacuum chamber 48 to the valve surface 182.

A spring 198 biases the operating member 20 rearwardly to a static position.

Valve operation

From the foregoing it will be understood that actuation of the brake pedal 16 is effective to push the operating member 20 forwardly and this in turn pushes the valve surface 168 forwardly. The spring 186 causes the valve seat member 170 to move forward and lap or close against the valve surface 182. This shuts off vacuum from chamber 48.

As the operating member 20 continues movement, the valve surface 168 breaks away from the valve seat member 170. Atmospheric pressure rushes through the bore 176 and on through the annular spring retainer 172 and past the now open valve surface 168 and around the valve actuator spool 160 and into the inside of the drive spool 88. It was previously described that the interior of the drive spool 88 is fluid connected with each of the atmospheric pressure chambers 50 and 52. Because of the vacuum existing in the atmospheric pressure chambers 50 and 52, atmospheric air rushes into these chambers and causes both of the walls 56 and 80 to be pressed forwardly because they now have pressure on the front side working against vacuum on the rear side. The vacuum chambers 44 and 46 continue to have vacuum therein. The result is that the power rod 26 is pressed toward the front of the unit thereby actuating the master cylinder 22.

Brake reaction

It was previously mentioned that an advantage of the present invention is the realistic reaction generated against the foot which provides a "feel" of the amount of braking. This is in proportion to the amount of braking and is accomplished by an annular disc-like reaction member 188. The reaction member 188 slides on a cylindrical surface 190 on the valve body 134. The reaction member 188 has a groove 192 that receives the inner end of the third diaphragm 100. The O-ring 193 disposed between the reaction member 188 and valve body 134 completes the separation of the two sides of the system. It was previously mentioned that a compression spring 158 biases the radial wall portion 138 of valve body 134 against the guide sleeve 140. However, since atmospheric chamber 52 is normally under vacuum, a spring 194 biases the reaction member 188 forwardly a sufficient distance to clear an O-ring bumper 196 carried at the forward end of the valve actuating spool 160.

There is sufficient clearance between the O-ring bumper 196 and the reaction member 188 to let the valve spool 160 be moved forwardly and opened very easily by a toe touch. The only pressure required to initially open the valve is that to overcome the bias of the relatively light return spring 198. A snap ring 200 limits the return movement of the valve spool 160.

As mentioned above, power is applied in two stages as follows:

(1) As the foot touches the brake pedal 16, power in the form of atmospheric air flows into the system at the opened annular valve surface 168 to move the brake shoes out to a "ready" position, just ready to contact the brake drums. At this instant the valve is popped back to a closed position by the atmospheric pressure build up in chamber 52, bearing against the annular reaction member 188, which forces it to the right, viewing the drawing. The reaction member 188 engages the bumper 196 and closes the valve 160.

(2) Further, foot pressure causes further application of power which results in actual braking force, simultaneously generating a reaction against the foot. This gives the brakes "feel" even though movement of the spool 20 may be only a meaker .040 inch, or the thickness of a dime.

The reaction is developed as pressure builds up in the atmospheric chamber 52. Since the first instant of opening valve spool 160, the reaction member 188 made contact with the valve spool 160. From this point, the foot must apply sufficient pressure to overcome the force exerted by the reaction member 188 in order to move the valve spool 160 enough to force the valve surface 168 away from a lap positition against the valve seat member 170. The reaction force thus continues to build up in proportion to the amount of brake effort and the "feel" produced is realistic, although only toe pressure is required to actuate the brake because of the power multiplication factor provided by the walls 56 and 80 of the power cylinder 10.

An important feature of the servomotor above described is that the valve body 134 does not move during the normal operation of the unit when power is available to operate the diaphragm walls 56 and 80. It will be observed that in the operation described, the pressure that is delivered to the power chamber 52 is also delivered against the third diaphragm 100 to hold the valve body 134 in operable abutment with the radial wall portion 148, e.g., the guide sleeve 140. This provides a normal condition in which no follow-up movement of the valve 126 for the drive spool 88 occurs; so that the control lever 16 which actuates the unit stays essentially in a constant position, other than the small .040 inch movement described above.

The diaphragm 100 flexes only very slightly between the reaction member 188 and the radial wall portion 138. The remainder of the diaphragm remains as illustrated under normal operation and it is flexed only upon failure of the vacuum source.

*The push through feature*

It is a further feature of the power brake of the present invention that manual actuation is available in the event of power failure. This is provided by the fact that the valve body 134 is movable within its guide sleeve 140.

In the event of a power failure the entire system will load with atmosphere through the line 42. Application of foot pressure to the brake pedal 16 then moves the operator member 20, forcing the reaction member 188 against the drive spool 88. From this point on the valve body 134 can move. Further movement of the drive spool 88 results in movement of the power rod 26 and thus the master cylinder 22. In this instance, there is no opposition by the reaction member 188 because vacuum chamber 48 is atmospherically loaded and thus the two sides of the diaphragm 100 are balanced, as are the two sides of the diaphragms 54 and 78. This type of movement wherein the manually actuated member follows the driven structure to give an indication of the displacement of the driven structure is known as "follow-up" movement by the art.

The present invention thus becomes a "follow-up" unit upon power failure.

*Summary*

It will be noted that there are no seals on the valve spool 160. Thus, it is free to move, except for light restraining springs. This is a substantial distinction from the cited prior art.

We claim:
1. In a fluid pressure servomotor having a housing with an end wall, including
    a movable wall therein forming a variable pressure chamber and a constant pressure chamber at opposite sides thereof,
    a valve body including a tubular portion slidably supported in said end wall of said housing,
    an annular cylinder formed on said tubular portion and having an end open towards said movable wall,
    an annular piston movable in said cylinder and being slidably mounted on said tubular portion,
    said annular piston and cylinder forming a fluid pressure chamber in constant communication with one of said constant pressure chambers,
    valve means freely slidable in said tubular portion and being manually movable to isolate said variable pressure chamber from said constant pressure chamber and to admit pressure to said variable pressure chamber to move said wall and annular piston in opposite directions,
    said annular piston being engageable with said valve means upon movement of said piston to resist manual movement of said valve means, and
    an annular diaphragm disposed in said variable pressure chamber with its inner circumference connected to said piston, its outer circumference connected to said housing and an intermediate portion in engagement with said valve body to maintain the latter in its initial position upon admission of fluid pressure to said variable pressure chamber.

2. In a fluid pressure servomotor,
    a housing including first and second spaced walls and being separated into two subchambers by means of a fixed internal wall,
    a movable wall in one of said subchambers dividing the subchamber into a first vacuum chamber and a power chamber, the power chamber being next to the fixed internal wall,
    a control valve for admitting atmospheric pressure into said power chamber to thereby drive said movable wall and produce power,
    the control valve comprising a valve body slidably mounted in one of the spaced walls of said housing and having a flange, with a flexible diaphragm operable between said flange and said fixed internal wall to separate the power chamber next to the wall from a second vacuum chamber on the other side of the wall, passage means around said fixed wall and said movable wall providing a fluid connection between said vacuum chambers,
    resilient means biasing said flange and said valve body against said one wall in which said valve body is slidably mounted,
    said valve body having a bore, and a shoulder therein forming a first annular valve surface,
    an annular valve seat movable in said first bore and engageable with said first annular valve surface, and resilient means biasing said valve seat towards said first annular valve surface for engagement therewith,
    valve means freely slidable in said bore and including a second annular valve surface within said first annular valve surface, and resilient means normally biasing said valve means into engagement with said movable annular valve seat, and passage means in said valve body providing fluid connection between said vacuum chamber on the other side of the wall and said bore of said valve body, whereby movement of said freely slidable valve means is effective to move said valve seat to a lap position with said first valve surface, and then said second valve surface away from said valve seat, to open said power chamber to the atmosphere.

3. The invention of claim 2 wherein said valve means comprises a solid cylindrical actuating spool of a single diameter.

4. The invention of claim 2 wherein said slidable valve body has a cylindrical land on the exterior surface,
an annular reaction member slidable on said cylindrical land and connected to said flexible diaphragm,
seal means between said valve body and said annular reaction member,
resilient means biasing said reaction member toward said movable wall,
and abutment means between said valve actuator spool and said reaction member.

5. The invention of claim 2 wherein said housing includes a second fixed wall dividing the housing into a third subchamber,
a second movable wall in the third subchamber dividing the third subchamber into a third vacuum chamber and a second power chamber, the second power chamber being next to the second fixed wall,
and drive means connecting said movable walls for simultaneous movement.

References Cited
UNITED STATES PATENTS

| | | | |
|---|---|---|---|
| 3,075,499 | 1/1963 | Prather | 91—391 |
| 3,151,532 | 10/1964 | Ayers | 91—391 |
| 3,152,518 | 10/1964 | Ayers | 91—391 |
| 3,352,209 | 11/1967 | Cripe | 91—391 |

PAUL E. MASLOUSKY, *Primary Examiner.*